United States Patent [19]

Schappler et al.

[11] Patent Number: 4,996,548
[45] Date of Patent: Feb. 26, 1991

[54] CAMERA WITH FLIP-UP FLASH UNIT

[75] Inventors: Joseph J. Schappler; David J. Glogan, both of Rochester; William L. Burnham, Leroy, all of N.Y.

[73] Assignee: Eastman Kodak Company, Rochester, N.Y.

[21] Appl. No.: 478,910

[22] Filed: Feb. 12, 1990

[51] Int. Cl.$^5$ .................. G03B 15/03; G03B 13/04
[52] U.S. Cl. .................... 354/149.11; 354/187; 354/219
[58] Field of Search .............. 354/126, 145.1, 149.1, 354/149.11, 187, 219, 288

[56] References Cited

U.S. PATENT DOCUMENTS

| D. 284,973 | 8/1986 | Hansen | D16/6 |
| 3,169,708 | 2/1965 | D'Incerti | |
| 4,231,645 | 11/1980 | Davis et al. | 354/145 |
| 4,319,818 | 3/1982 | Sawara | 354/145 |
| 4,350,420 | 9/1982 | Engelsmann et al. | 354/145 |
| 4,387,978 | 6/1983 | Pizzuti | 354/219 |
| 4,557,571 | 12/1985 | Reibl | 354/149.11 |
| 4,847,647 | 7/1989 | Ueda | 354/149.1 |

FOREIGN PATENT DOCUMENTS 52-125437 10/1977 Japan .
58-208735 12/1983 Japan .

Primary Examiner—A. A. Mathews
Attorney, Agent, or Firm—Roger A. Fields

[57] ABSTRACT

A flip-up flash unit for a camera has a built-in viewfinder opening for viewing a subject to be photographed when the flash unit is swung to an operative position elevated from the body of the camera. The body of the camera, therefore, can be made more compact because the need for a viewfinder opening in the body is eliminated.

11 Claims, 2 Drawing Sheets

CAMERA WITH FLIP-UP FLASH UNIT

Reference is made to commonly assigned copending application Ser. No. 07/478,909 entitled CAMERA WITH FLIP-UP FLASH UNIT, and filed Feb. 12, 1990, in the names of William L. Burnham et al.

BACKGROUND OF THE INVENTION

1. Field of the Invention

The invention relates generally to the field of photography and particularly to a camera with a flip-up flash unit.

2. Description of the Prior Art

A current trend in camera design is to incorporate an electronic flash unit in the camera housing and yet make such housing relatively small in size in order to increase its ease of storage, portability and handling. Examples of smaller size cameras with built-in electronic flash units are the various disk film cameras, such as previously sold by Eastman Kodak Company and others. As a consequence of making a camera smaller in size, the separation between a built-in flash unit and the taking lens is reduced, thereby possibly creating an undesirable effect commonly known as "red-eye". When using a flash unit and a color print film, red-eye is typified by the pupils in the eyes of a person being photographed coming out red-tinted on a developed color print. Such phenomenon is attributable to the incidence into the taking lens of the red light reflected from the retinas in the person's eyes illuminated by the flash light.

Red-eye may be substantially avoided by increasing the separation between the flash unit and the taking lens. As a result, light from the flash unit will reach the eyes of a person being photographed at too great an angle to be reflected by his retinas into the taking lens. In U.S. Pats. No. 4,231,645, granted Nov. 4, 1980, No. 4,319,818, granted Mar. 16, 1982, No. 4,557,571, granted Dec. 10, 1985, No. Des. 284,973 granted Aug. 5, 1986, No. Des. 285,087, granted Aug. 12, 1986, and No. 4,847,647, granted July 11, 1989, red-eye appears to be substantially avoided without increasing the size of a compact 35 mm camera to any great degree by providing a built-in electronic flash unit that is pivotable with respect to the camera housing. The flash unit is pivotable between an inactive folded position in which it forms an integrated part of the camera housing in front of the camera lens and/or the camera viewfinder, and an operative erect position in which it is sufficiently removed from the lens to permit picture-taking substantially without the occurrence of red-eye. In each of these designs, however, some compactness is sacrificed because of the need to include a viewfinder opening in the camera housing.

SUMMARY OF THE INVENTION

As compared to the prior art examples described in the above-cited patents, the invention advantageously provides a photographic camera including a flip-up flash unit with improved compactness.

According to the invention, in a preferred embodiment, a photographic camera comprising (a) a camera housing and (b) a flip-up flash unit including a head part having a flash emission window and at least one supporting part for the head part pivotally connected to the camera housing to permit swinging movement of the flash unit to a folded storage position in which the head part and the supporting part cover respective portions of the camera housing and to a non-folded operative position in which the head part and the supporting part are elevated from the camera housing with the flash emission window substantially facing a subject to be photographed, is characterized in that:

the supporting part of the flash unit has a viewfinder opening for viewing a subject to be photographed when the flash unit is in the non-folded position, whereby the camera housing can be made relatively compact because a viewfinder opening need not be provided in the camera housing.

DETAILED DESCRIPTION OF THE PREFERRED EMBODIMENT

The invention is described as being embodied in a compact 35 mm camera with a built-in electronic flash unit. Because such photographic cameras have become well known, this description is directed in particular to camera elements forming part of or cooperating directly with the preferred embodiment. It is to be understood, however, that camera elements not specifically shown or described may take various forms known to persons of ordinary skill in the art.

Figure 1:
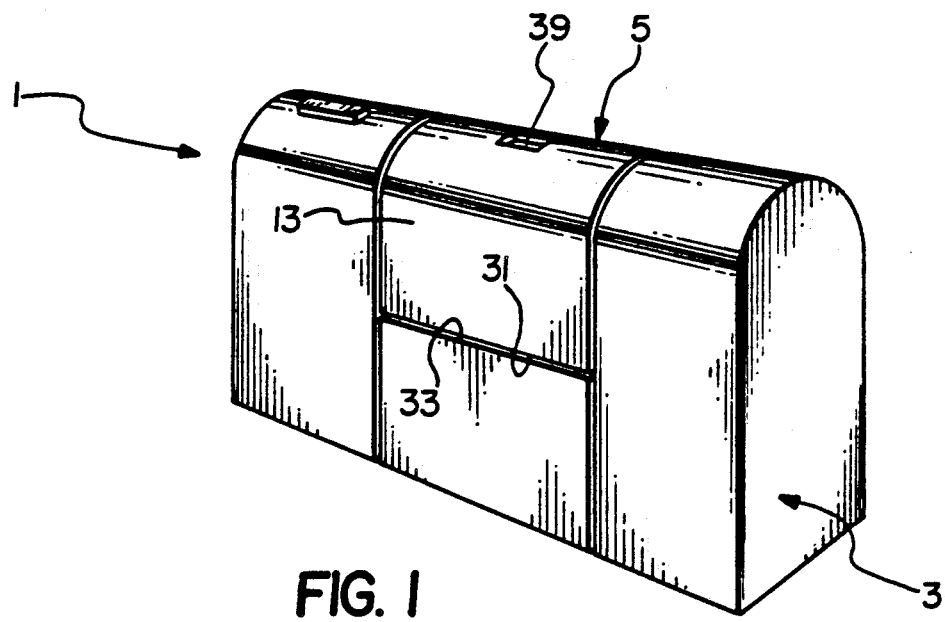
FIG. 1 is a front perspective view of a photographic camera with a flip-up flash unit according to a preferred embodiment of the invention, showing the flash unit in a folded storage position.
Figure 2:
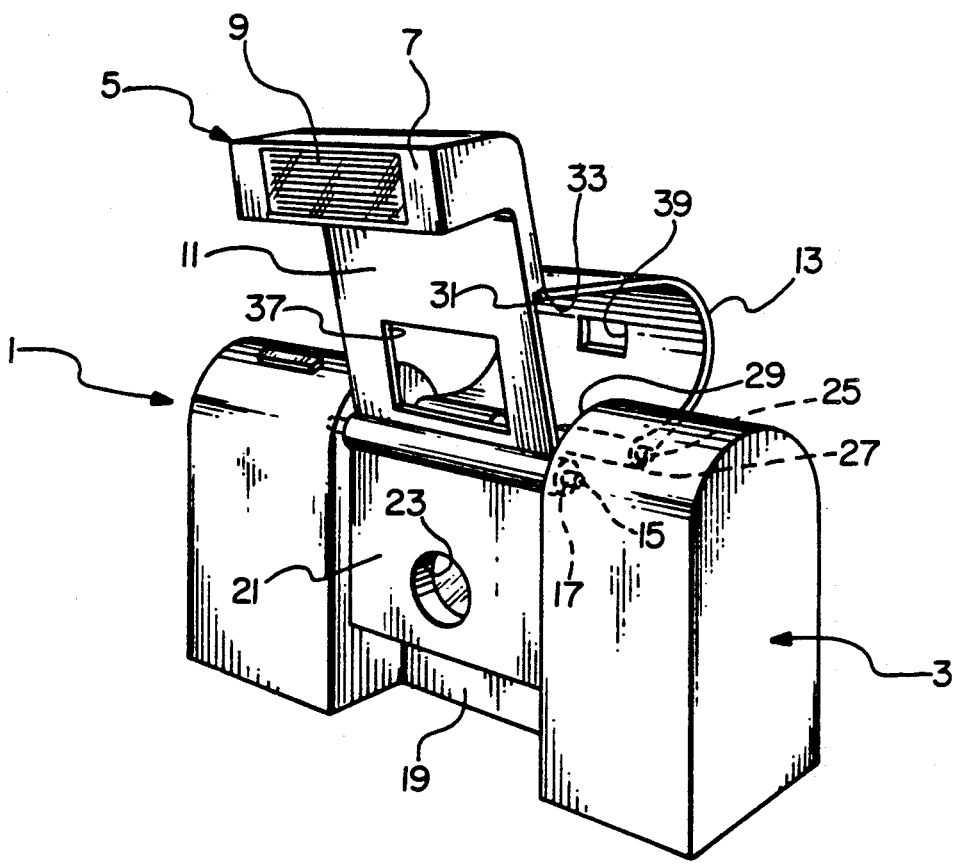
FIG. 2 is a view similar to FIG. 1, showing the flash unit in a non-folded operative position.

Referring now to the drawings, FIGS. 1 and 2 show a compact 35 mm camera 1 comprising a contoured housing 3 and a flip-up electronic flash unit 5. The flash unit 5 includes a head part 7 having a flash emission window 9 and a pair of front and rear supporting parts 11 and 13 for the head part. The front supporting part 11 is integrally formed with the head part 7, and is pivotally connected to the camera housing 3 by means of an axial pin 15 extending through an axial opening 17 in the front supporting part and having protruding opposite ends suspended by the camera housing. The pivotal connection of the front supporting part 11 to the camera housing 3 permits the flash unit 5 to be manually swung between a folded storage position, shown in FIGS. 1 and 3, in which the head part 7 fits within a lower recess 19 in the camera housing and the front supporting part fits within a front recess 21 in the camera housing to cover a lens opening 23, and a non-folded operative position, shown in FIGS. 2 and 5, in which the head part and the front supporting part are elevated from the camera housing with the flash emission window 9 substantially facing a subject to be photographed. The rear supporting part 13 is pivotally connected to the camera housing 3 by means of an axial pin 25 extending through an axial opening 27 in the rear supporting part and having protruding opposite ends suspended by the camera housing. The pivotal connection of the rear supporting part 13 to the camera housing 3 permits that part to be located within a top recess 29 in the camera housing when the flash unit 5 is in its folded position, shown in FIGS. 1 and 3, and to be elevated above the camera housing when the flash unit is in its non-folded position, shown in FIGS. 2 and 5. When the flash unit 5 is in its non-folded position, a forward edge 31 of the rear supporting part 13 engages or abuts the front supporting part 11 at a cross-wise edge 33 of the latter part to brace the flash unit in the non-folded position. A relatively light torsion spring 35 urges the rear supporting part 13 to engage the front supporting part 11. See FIGS. 4 and 5.

According to the invention, in its preferred embodiment, the front supporting part 11 has a rectangular front viewfinder opening 37, and the rear supporting part 13 has a rectangular rear viewfinder opening 39. The rear viewfinder opening 39 is smaller than the front viewfinder opening 37 and is located behind the front opening in alignment with that opening when the flash unit 5 is in its non-folded position to permit a subject to be photographed to be viewed through the two openings. See FIGS. 2 and 5. The rear supporting part 13 is bowed to arch rearwardly of the camera housing 3 when the flash unit 5 is in its non-folded position to locate the rear viewfinder opening 39 sufficiently removed from the camera housing to permit a photographer to place one eye at the rear opening without any interference (obstruction) by the camera housing. See FIG. 5. Conversely, when the flash unit 5 is in its folded position, the rear supporting part 13 is urged by the torsion spring 35 to cover the front viewfinder opening 37. See FIG. 3.

Operation

Figure 3:
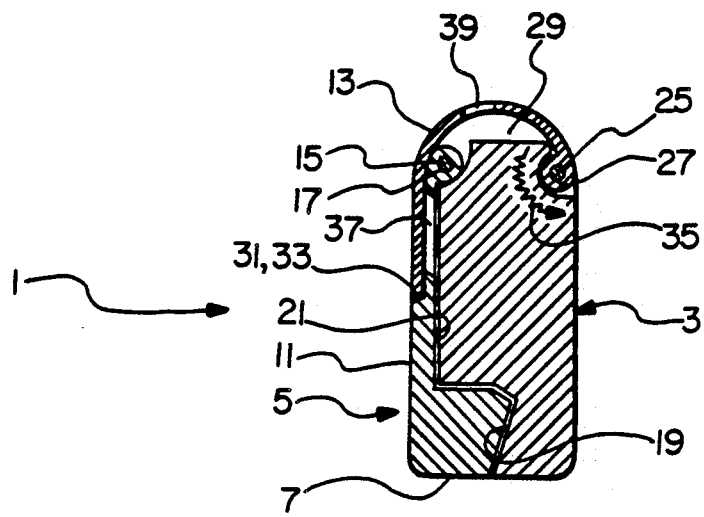
FIGS. 3, 4 and 5 are side elevation section views of the camera, showing progressive movement of the flash unit from its folded position, to an intermediate position and to its non-folded position.
Figure 4:
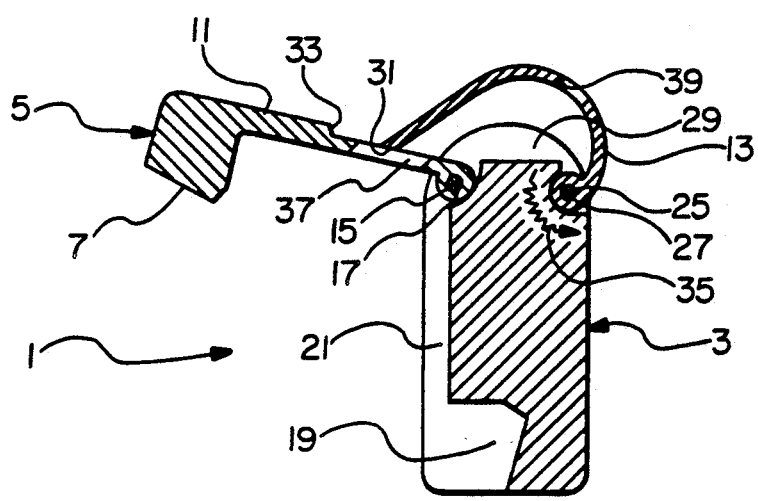
Figure 5:
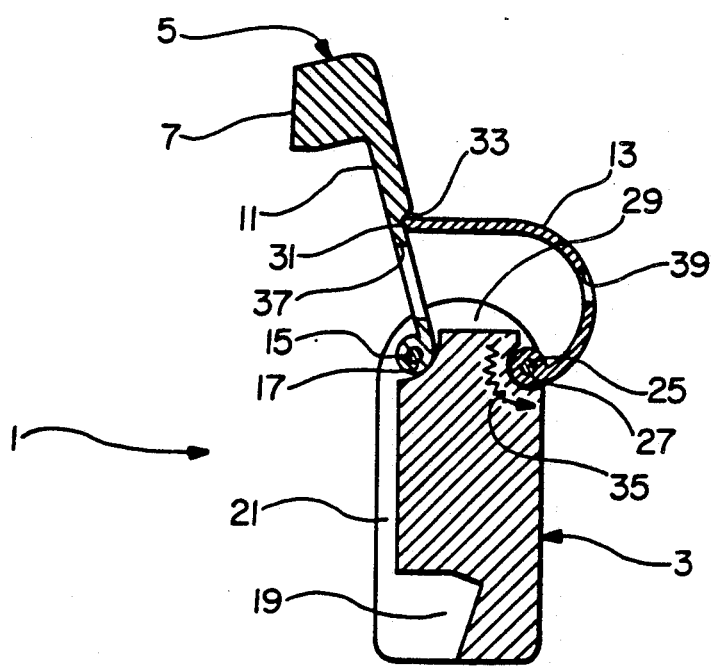

To use the 35 mm camera 1, the flash unit 5 must be manually swung from its folded position, shown in FIGS. 1 and 3, to its non-folded position, shown in FIGS. 2 and 5. As the flash unit 5 is swung to its non-folded position, the front supporting part 11 pushes against the rear supporting part 13 to swing the latter part out of the top recess 29. See FIG. 4. Once the forward edge 31 of the rear supporting part 13 and the cross-wise edge 33 of the front supporting part 11 engage, the front part is braced in its non-folded position and the front and rear viewfinder openings 37 and 39 are aligned. See FIG. 5.

After picture-taking is completed, the flash unit 5 is manually swung from its non-folded position to its folded position. As the flash unit 5 is swung to its folded position, the torsion spring 39 pivots the rear supporting part 13 to maintain the latter part in continuous contact with the front supporting part 11. See FIG. 4. When the flash unit 5 is returned to its folded position, the rear supporting part 13 covers the front viewfinder opening 37. See FIG. 3.

While the invention has been described with reference to a preferred embodiment, it will be understood that various modifications can be effected within the ordinary skill in the art without departing from the scope of the invention. For example, a 35 mm camera may be devised as in cited U.S. Pats. Nos. 4,557,571; 4,350,420 and 4,319,818, in which the flip-up flash consists of a head part and only one supporting part. This is in contrast with cited U.S. Pats. Nos. Des. 285,087 and 284,973 in which the flip-up flash includes front and rear supporting parts.

According to another example, the flash unit might be a pop-up type as compared to a flip-up type.

We claim:

1. A photographic camera comprising (a) a camera housing and (b) a flip-up flash unit including a head part having a flash emission window and at least one supporting part for said head part pivotally connected to said camera housing to permit swinging movement of said flash unit to a folded storage position in which the head part and said supporting part cover respective portions of the camera housing and to a non-folded operative position in which the head part and the supporting part are elevated from the camera housing with said flash emission window substantially facing a subject to be photographed, is characterized in that:

said supporting part of said flash unit has a viewfinder opening for viewing a subject to be photographed through said viewfinder opening when the flash unit is in the non-folded position; and a cover part is connected to said camera housing separately from said flash unit to permit movement of said cover part to completely cover said viewfinder opening when the flash unit is in the folded position.

2. A photographic camera as recited in claim 1, wherein said cover part is movable to be completely removed from said viewfinder opening in said support part to uncover the viewfinder opening when said flash unit is swung to the non-folded position.

3. A photographic camera as recited in claim 2, wherein said cover part has a viewfinder opening that is smaller than said viewfinder opening in said supporting part and is located behind the latter opening when said flash unit is in the non-folded position to permit a subject to be photographed to be viewed through the two openings.

4. A photographic camera as recited in claim 3, wherein said cover part is shaped to protrude rearwardly of said camera housing when said flash unit is in the non-folded position to locate said viewfinder opening in the cover part sufficiently removed from the camera housing to permit one to access the latter opening without any interference by the camera housing.

5. A photographic camera comprising (a) a camera housing and (b) a flip-up flash unit including a head part having a flash emission window and a pair of supporting parts for said head part pivotally connected to said camera housing to permit swinging movement of said flash unit to a folded storage position in which the head part and said supporting parts cover respective portions of the camera housing and to a non-folded operative position in which the head part and the supporting parts are elevated from the camera housing with said flash emission window substantially facing a subject to be photographed and one of the supporting parts located behind the other one, is characterized in that:

said supporting parts of said flash unit have respective viewfinder openings for viewing a subject to be photographed when the flash unit is in the non-folded position, whereby said camera housing can be made relatively compact because a viewfinder opening need not be provided in the camera housing.

6. A photographic camera as recited in claim 5, wherein said supporting part that is located behind said other one when said flash unit is in the non-folded position covers said viewfinder opening in the other one when the flash unit is in the folded position.

7. A photographic camera as recited in claim 5, wherein said supporting part that is located behind said other one when said flash unit is in the non-folded position is bowed to arch rearwardly of said camera housing to locate said viewfinder opening in the supporting part sufficiently removed from the camera housing to permit one to access the latter opening without any interference by the camera housing.

8. A photographic camera comprising (a) a camera housing and (b) an integral flash unit connected to said camera housing to permit movement of said flash unit to an operative position in which the flash unit is extended from the camera housing to substantially face a subject to be photographed, is characterized in that:

said flash unit has a built-in first viewfinder opening for viewing a subject to be photographed through said first viewfinder opening when the flash unit is in its operative position; and means having a built-in second viewfinder opening is connected to said camera housing separately from said flash unit to permit movement of said means to an operative position in which said second viewfinder opening will be optically aligned with said first viewfinder opening for viewing a subject to be photographed through both of the openings when the flash unit is in its operative position.

9. A photographic camera as recited in claim 8, wherein said means includes a cover part movable to completely cover said first viewfinder opening when said flash unit is moved out of its operative position.

10. A photographic camera comprising (a) a camera housing and (b) a flip-up flash unit including a head part having a flash emission window and at least one supporting part for said head part pivotally connected to said camera housing to permit swinging movement of said flash unit to a folded storage position in which the head part and said supporting part cover respective portions of the camera housing and to a non-folded operative position in which the head part and the supporting part are elevated from the camera housing with said flash emission window substantially facing a subject to be photographed, is characterized in that:

said supporting part of said flash unit has a viewfinder opening for viewing a subject to be photographed when the flash unit is in the non-folded position; and a back part movable into engagement with said supporting part responsive to swinging of said flash unit to the non-folded position to brace the flash unit in that position, said back part having a viewfinder opening that is located behind said viewfinder opening in the supporting part when the flash unit is in the non-folded position to permit a subject to be photographed to be viewed through the two openings.

11. A photographic camera as recited in claim 10, wherein said back part is movable to cover said viewfinder opening in said supporting part as said flash unit is swung to the folded position.

* * * * *